US010097128B2

(12) United States Patent
Zhang et al.

(10) Patent No.: US 10,097,128 B2
(45) Date of Patent: Oct. 9, 2018

(54) ELECTRONIC PUMP (71) Applicant: Hangzhou Sanhua Research Institute Co., Ltd., Hangzhou, Zhejiang (CN)

(72) Inventors: Lulu Zhang, Zhejiang (CN); Xuexia Gong, Zhejiang (CN); Boning Ye, Zhejiang (CN); Hongmin Lu, Zhejiang (CN)

(73) Assignee: Zhejiang Sanhua Automotive Components Co., Ltd., Hangzhou, Zhejiang (CN)

( * ) Notice: Subject to any disclaimer, the term of this patent is extended or adjusted under 35 U.S.C. 154(b) by 85 days.

(21) Appl. No.: 15/244,941

(22) Filed: Aug. 23, 2016

(65) Prior Publication Data

US 2017/0063281 A1 Mar. 2, 2017

(30) Foreign Application Priority Data

Aug. 26, 2015 (CN) .......................... 2015 1 0531396

(51) Int. Cl.
*H02P 29/024* (2016.01)
*F04D 13/06* (2006.01)
(Continued)

(52) U.S. Cl.
CPC ........ *H02P 29/027* (2013.01); *F04D 13/0673* (2013.01); *F04D 13/0686* (2013.01); *F04D 13/0693* (2013.01); *F04D 25/0613* (2013.01); *H02K 5/12* (2013.01); *H02K 11/215* (2016.01); *H02K 11/33* (2016.01); *H02P 6/16* (2013.01); *H02P 29/032* (2016.02); *F04D 1/00* (2013.01); *H02K 2211/03* (2013.01)

(58) Field of Classification Search
CPC ..................................................... H02P 29/027
USPC ................. 318/400.22, 400.21, 400.01, 700
See application file for complete search history.

(56) References Cited

U.S. PATENT DOCUMENTS

| 5,708,337 | A | * | 1/1998 | Breit | ...................... E21B 43/128 318/400.09 |
| 5,757,151 | A | * | 5/1998 | Donegan | .................. B60K 6/30 180/65.245 |

(Continued)

FOREIGN PATENT DOCUMENTS

WO    WO 97/42701 A1    11/1997

OTHER PUBLICATIONS

Extended European Search Report for Application No. EP 16185339.5 dated Jan. 23, 2017.

*Primary Examiner* — David S Luo
(74) *Attorney, Agent, or Firm* — Wolf, Greenfield & Sacks, P.C.

(57) ABSTRACT

An electronic pump includes a controller. The controller includes a power input terminal, a printed circuit board, a motor driver and a microprocessor. The power input terminal, the microprocessor and the motor driver are spaced from each other by an electronic clearance and are fixedly connected to the printed circuit board. The microprocessor is electrically connected to the motor driver by the printed circuit board. The motor driver drives a motor to rotate based on a drive control signal from the microprocessor. There is no motor drive circuit composed by discrete components and configured to drive the motor to rotate separately arranged on the printed circuit board between the motor driver and a motor.

16 Claims, 4 Drawing Sheets

(51) Int. Cl.
  *H02K 5/12* (2006.01)
  *H02K 11/33* (2016.01)
  *H02K 11/215* (2016.01)
  *H02P 29/032* (2016.01)
  *F04D 25/06* (2006.01)
  *H02P 6/16* (2016.01)
  *F04D 1/00* (2006.01)

(56) References Cited

U.S. PATENT DOCUMENTS

2001/0051098 A1    12/2001   Kenney et al.
2011/0110792 A1     5/2011   Mauro et al.

\* cited by examiner

ELECTRONIC PUMP

CROSS-REFERENCE TO RELATED APPLICATIONS

This application claims the priority to Chinese Patent Application No. 201510531396.7, entitled "ELECTRONIC PUMP" and filed on Aug. 26, 2015 with the State Intellectual Property Office of People's Republic of China, which is incorporated herein by reference in its entirety.

TECHNICAL FIELD

The present disclosure relates to components of an automobile, and more particularly to components of an automobile thermal management system.

BACKGROUND

Currently, a control circuit board of an electronic pump in the market includes an embedded microprocessor, a motor pre-drive integrated chip and a motor drive circuit independent from the motor pre-drive integrated chip. The motor drive circuit is a circuit composed by some discrete electrical components. On the one hand, the discrete electrical components occupy a lot of space. On the other hand, the discrete electrical components cause a lot of energy consumption.

Therefore, it is necessary to improve the conventional technology to reduce the power consumption of the electronic pump control system and improve the reliability and compatibility of the electronic pump control system.

SUMMARY

An electronic pump with low energy consumption is provided.

An electronic pump includes a controller and a motor. The controller includes a power input terminal, a printed circuit board, a motor driver and a microprocessor. The power input terminal, the microprocessor and the motor driver are spaced from each other by an electronic clearance and are fixedly connected to the printed circuit board. The microprocessor is electrically connected to the motor driver by the printed circuit board.

The microprocessor outputs or stops outputting a motor drive control signal based on a received control signal. The motor driver drives the motor to rotate based on the motor drive control signal from the microprocessor.

There is no motor drive circuit composed by discrete components and configured to drive the motor to rotate arranged separately on the printed circuit board between the motor driver and the motor.

In the disclosure, the motor driver of the control circuit board of the electronic pump integrates the function of driving a motor. Therefore, there is no need to arrange a motor drive circuit composed by discrete electric components on the control circuit board, which avoids setting of peripheral discrete components and reduces the energy consumption.

DESCRIPTION OF EMBODIMENTS

Hereinafter embodiments of the present disclosure are described in detail in conjunction with the drawings.

Figure 1:
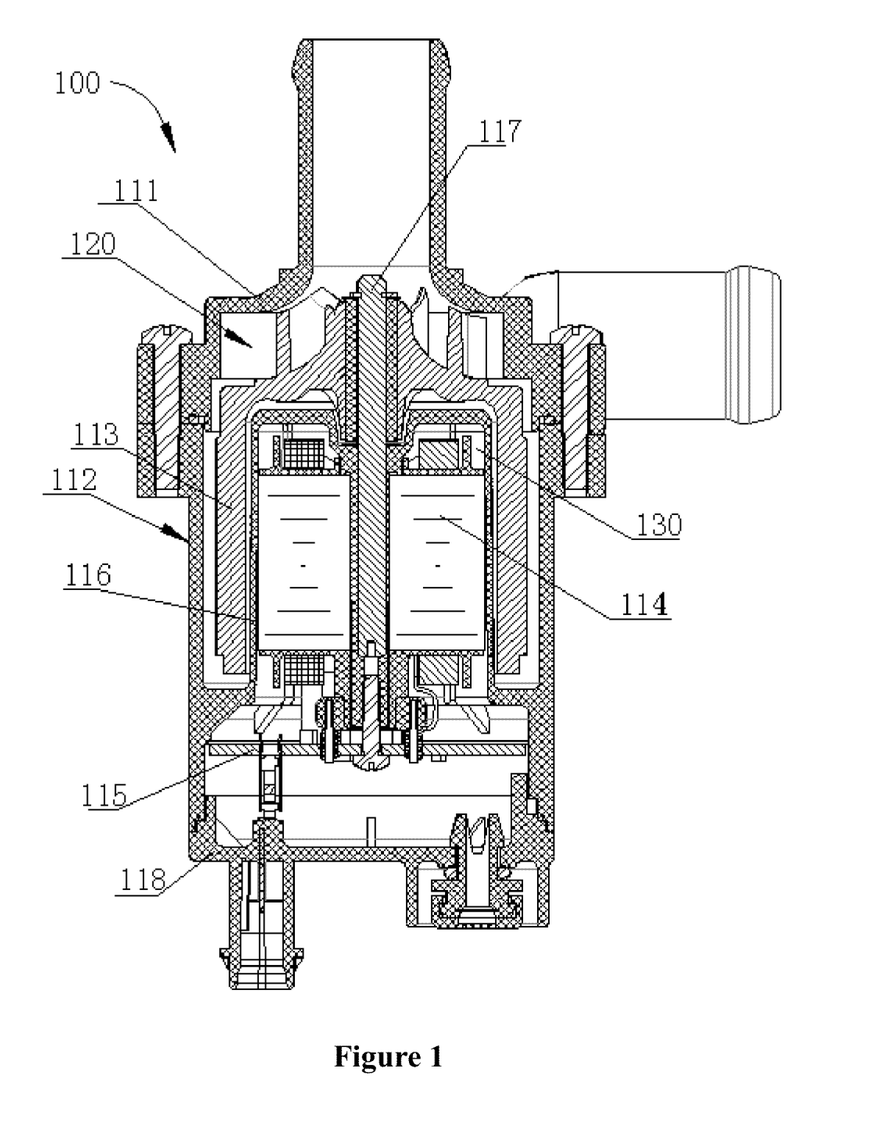
FIG. 1 is a schematic view of an electronic pump according to an embodiment of the disclosure.

FIG. 1 is a schematic view of an electronic pump according to an embodiment of the disclosure. The electronic pump of the embodiment can be applied to an automobile thermal management system. The electronic pump 100 includes a first case 111, a second case 112, an end cover 118, a shaft 117, a rotor assembly 113, a stator assembly 114 and a controller 115. An inner cavity of the pump includes the cavity among the first case 111, the second case 112 and the end cover 118. A partition 116 divides the inner cavity of the pump into a wet cavity 120 where working medium can flow and a dry cavity 130 where no working medium flows. The rotor assembly 113 is arranged in the wet cavity 120. No working medium flows through the dry cavity 130. The stator assembly 114 and the controller 115 are arranged in the dry cavity 130. The stator assembly 114 and the controller 115 are electrically connected. The controller 115 is connected to the outside via a connector. The shaft 117 and the partition 116 are arranged fixedly.

Figure 2:
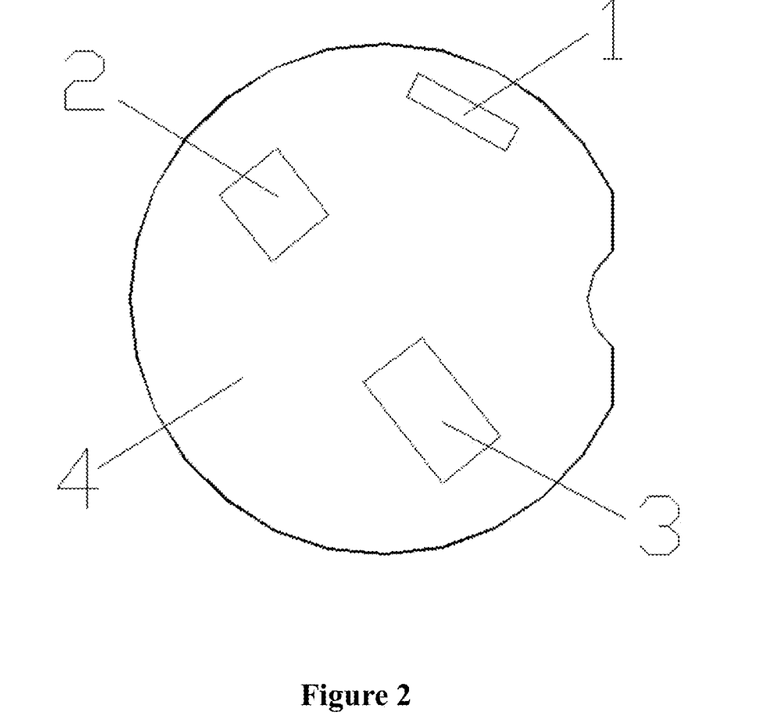
FIG. 2 is a schematic view of an appearance of a controller of an electronic pump according to an embodiment of the disclosure.

FIG. 2 is a schematic view of a controller 115 according to an embodiment of the disclosure. The controller 115 includes a printed circuit board 4, a power input terminal 1, a microprocessor 2 and a motor driver 3. The power input terminal 1, the microprocessor 2 and the motor driver 3 are spaced from each other by electronic clearances and are fixedly connected to the printed circuit board 4. A printed circuit (not shown in FIG. 2) is formed on the printed circuit board 4. The power input terminal 1, the microprocessor 2 and the motor driver 3 are electrically connected to each other by the printed circuit. The power input terminal 1 is an interface for providing power of a power supply to the controller 115. The power supply may be a battery of an automobile, and the input voltage may be 9V-16V.

Figure 3:
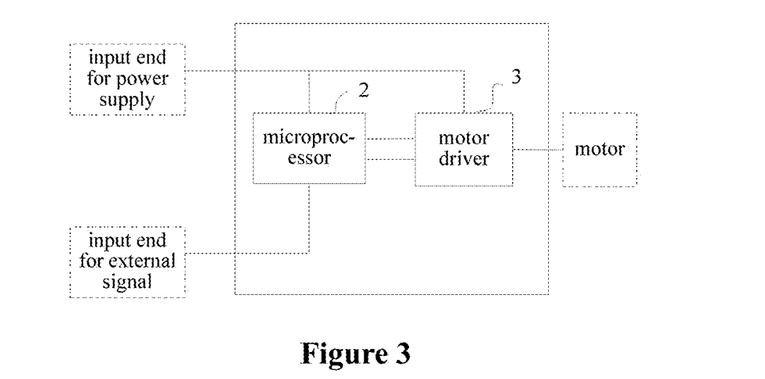
FIG. 3 is a block view of a controller of FIG. 1 according to an embodiment of the disclosure.

FIG. 3 is a block view of the controller of an electronic pump. The microprocessor 2 outputs or stops outputting a motor drive control signal based on a control signal received from the outside of the controller 115. The motor driver 3 drives a motor to rotate based on the motor drive control signal from the microprocessor 2. The control signal received from the outside by the microprocessor 2 may come from an automobile controller. The control signal may include a target rotation speed range of the motor. The motor drive control signal outputted by the microprocessor 2 may be a pulse width modulation signal.

Figure 4:
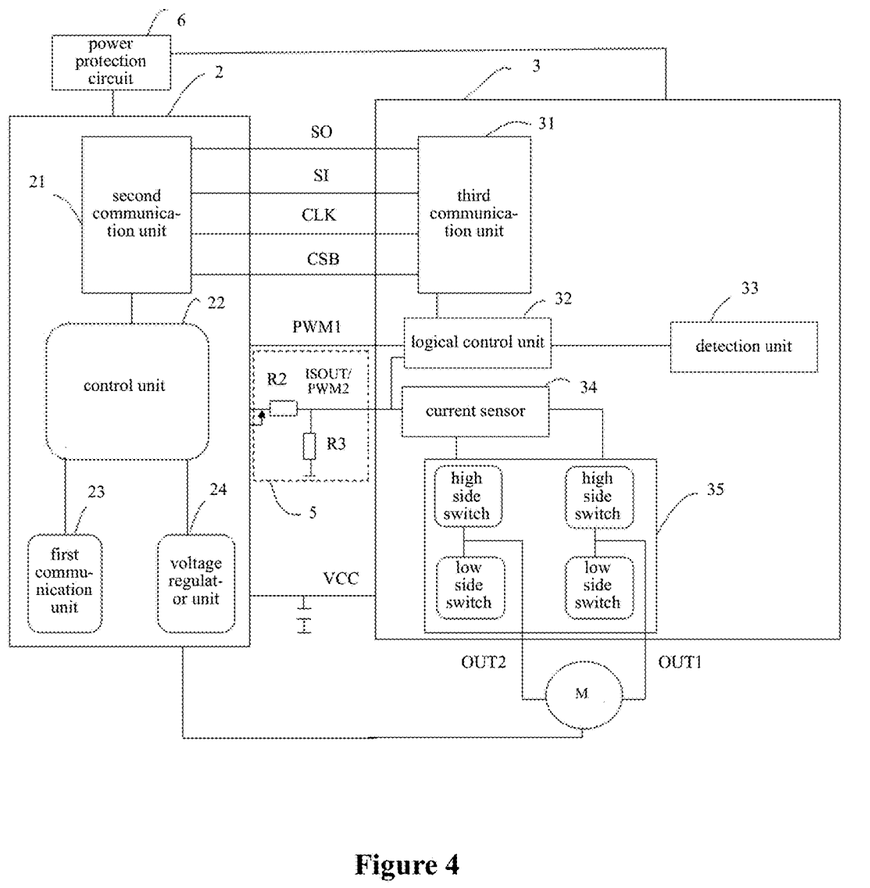
FIG. 4 is a circuit diagram of connection of a microprocessor and a motor driver of a controller of an electronic pump according to an embodiment of the disclosure.
Figure 5:
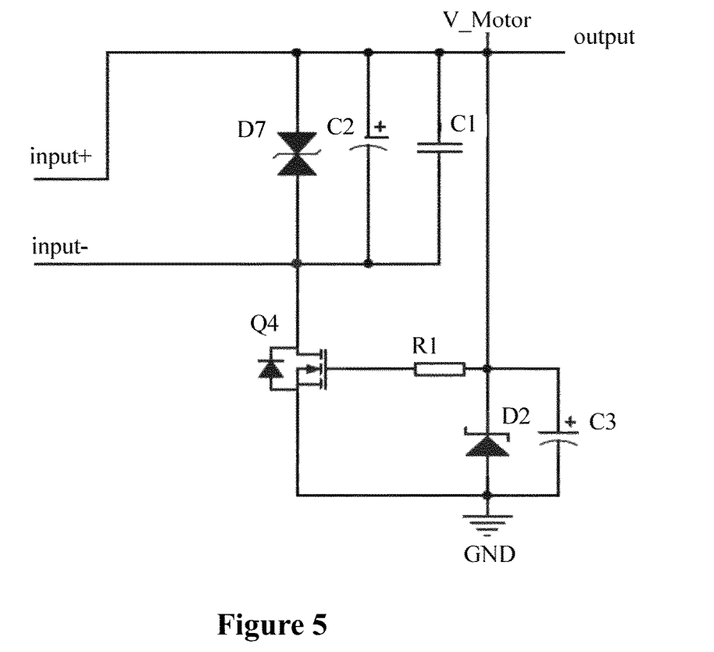
FIG. 5 is a circuit diagram of a power protection circuit of FIG. 4 according to an embodiment of the disclosure.

As shown in FIG. 4, besides the microprocessor 2 and the motor driver 3, the controller of the embodiment further includes a power protection circuit 6. The power protection circuit 6 includes an input end and an output end. The input end is connected to a power supply (not shown in FIG. 4). The output end is connected to the microprocessor 2 and the motor driver 3. The power protection circuit 6 is configured to prevent the microprocessor 2 and the motor driver 3 from being damaged due to a case that the microprocessor 2 and the motor driver 3 are reversely connected to a positive of the power supply and an earth wire of the power supply. Referring to FIG. 5, in an implementation, the power protection circuit 6 includes a first capacitor C1, a second capacitor C2, a metal oxide semiconductor transistor (MOS) Q4, a first diode D7, a second diode D2 and a first resistor R1. One end of the first capacitor C1 is connected to the positive of the power supply. The other end of the first capacitor C1 is connected to the negative of the power supply. The second capacitor C2 is connected to the first capacitor C1 in parallel. The capacitance of the second capacitor C2 is greater than the capacitance of the first capacitor C1. The second capacitor C2 filters out the low frequency signal of the power supply. The first capacitor C1 filters out the high frequency signal of the power supply. The first diode D7 is a bidirectional transient voltage suppression diode. The first diode D7 is connected to the first capacitor C1 in parallel. The first diode D7 is at the most front end of the power protection circuit, i.e., located at the front of the first capacitor C1 and the second capacitor C2. The first diode D7 is configured to absorb the transient surge voltage in the positive and protect the post-stage circuit devices of the power protection circuit from being damaged. The second diode D2 is a transient voltage regulator diode. The second diode D2 includes an anode and a cathode. The anode is connected to a reference ground GND and the cathode is connected to the positive of the power supply, to ensure the stability of the voltage at the output end of the power protection circuit. The metal oxide semiconductor transistor Q4 includes a drain electrode, a source electrode and a gate electrode. The drain electrode is connected to the negative of the power supply. The source electrode is connected to the reference ground GND. The gate electrode is connected to one end of the first resistor R1. The metal oxide semiconductor transistor Q4 is configured to prevent the positive and the negative of the power supply from being reversely connected to the power protection circuit 6. One end of the first resistor R1 is connected to the positive of the power supply. The other end of the first resistor R1 is connected to the metal oxide semiconductor transistor Q4. At working time, a power supply of a battery of an automobile is connected to the input end of the power protection circuit 6 and then is connected to the metal oxide semiconductor transistor Q4 by the first diode D7, the first capacitor C1, the second capacitor C2. An on-resistance of the metal oxide semiconductor transistor Q4 is very small, which is generally a few milliohms to a few dozens of milliohms. If the microprocessor 2 and the motor driver 3 connected to the output end of the power protection circuit 6 are working, the voltage of the metal oxide semiconductor transistor Q4 is very small, which is generally less than 0.2V, and some are even a few dozens of millivolts, which effectively reduces the power consumption.

Figure 6:
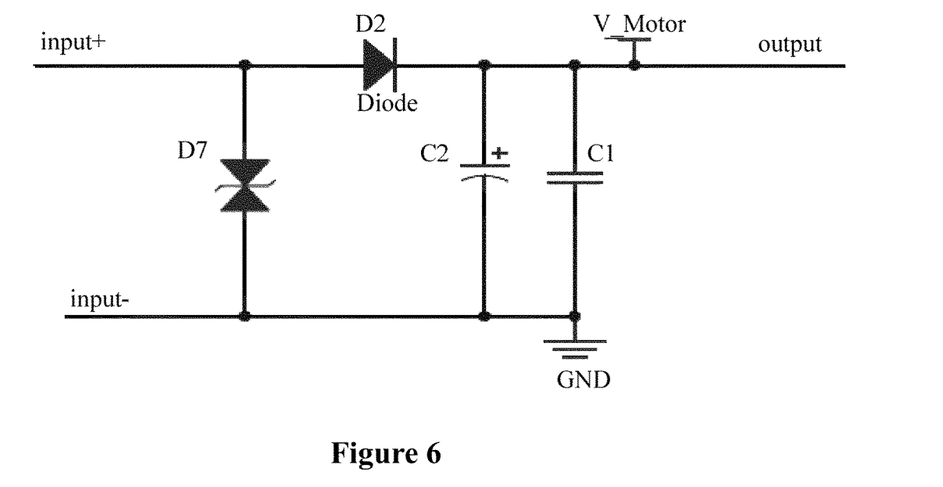
FIG. 6 is another circuit diagram of a power protection circuit of FIG. 4 according to an embodiment of the disclosure.

FIG. 6 is another embodiment of the power protection circuit 6. The power protection circuit 6 includes a first capacitor C1, a second capacitor C2, a first diode D7 and a second diode D2. One end of the first capacitor C1 is connected to the positive of the power supply. The other end of the first capacitor C1 is connected to the negative of the power supply. The first capacitor C1 is connected to the second capacitor C2 in parallel. The capacitance of the second capacitor C2 is greater than the capacitance of the first capacitor C1. The second capacitor C2 filters out the low frequency signal of the power supply. The first capacitor C1 filters out the high frequency signal of the power supply. The first diode D7 is a bidirectional transient voltage suppression diode. The first diode D7 is connected to the first capacitor C1 in parallel. The first diode D7 is in the most front end of the power protection circuit, i.e., located at the front of the first capacitor C1 and the second capacitor C2. The first diode D7 is configured to absorb the transient surge voltage in the positive and protect the post-stage circuit devices of the power protection circuit from being damaged. The second diode D2 is an ordinary diode. The second diode D2 is connected to the positive of the power supply in series to prevent the positive and the negative of the power supply from being reversely connected to the power protection circuit. When the positive and the negative of the power supply are reversely connected to the power protection circuit, the current passing through the second diode D2 is blocked and can not pass through the post-stage circuit, thereby protecting the post-stage circuit.

The microprocessor 2 includes a first communication unit 23, a second communication unit 21, a control unit 22 and a voltage regulator unit 24. The first communication unit 23 receives a control signal, and analyzes the control signal and sends an analyzed control signal to the control unit 22. The control unit 22 outputs or stops outputting the motor drive control signal based on the analyzed control signal. The motor drive control signal includes the pulse width modulation signal.

The first communication unit 23 and the automobile controller may adopt a local interconnect network (LIN) protocol. The first communication unit 23 includes a communication interface for communicating a control signal of the automobile controller and a signal of the fed back current rotation speed and phase of the motor, so that the control unit 22 can communicate with the automobile controller. The first communication unit 23 is integrated into the microprocessor 2, therefore, there is no need to arrange a transceiver composed of discrete devices at the outside of the microprocessor 2, which reduces the energy consumption of the controller.

The motor driver 3 includes a third communication unit 31. The second communication unit 21 communicates with the third communication unit 31 to implement the communication between the microprocessor 2 and the motor driver 3. The communication between the microprocessor 2 and the motor driver 3 may adopt an SPI mode. A specific SPI pin or an I/O interface may be set on the second communication unit 21 of the microprocessor 2. If the I/O interface is set on the second communication unit 21, successful communication can be obtained by simulating a timing sequence of the SPI communication protocol on the software.

The voltage regulator unit 24 is a Low-voltage analog circuit integrated in the microprocessor 2. The voltage regulator unit 24 has an output voltage ranges from 7V to 30V. The output of the voltage regulator unit 24 is provided to the control unit 22, the first communication unit 23 and the second communication unit 21.

The control unit 22 controls the rotation speed of the motor by sending the pulse width modulation signal to the motor driver 3.

The motor driver 3 includes a logical control unit 32, a detection unit 33, a main drive unit 35 and a current protection unit. The logical control unit 32 performs logical process on the control signal from the control unit 22 and sends a logical control signal to the main drive unit 35. The main drive unit 35 drives the motor to rotate based on the logical control signal from the logical control unit 32. The logical process is to convert the motor drive control signal of the control unit 22 to be the logical control signal controlling the operation of the main drive unit 35.

The main drive unit 35 includes four N-type metal oxide semiconductor (NMOS) transistors. Two of the N-type metal oxide semiconductor transistors are high side switches and the other two of the N-type metal oxide semiconductor transistors are low side switches. The structure of the main drive unit is a full bridge structure. The stability and reliability of the main drive unit 35 with the full bridge structure are greater than those of structure built by discrete devices. Alternatively, the main drive unit 35 may adopt a half bridge structure, to reduce the manufacturing cost of the main drive unit 35. But the efficiency of the main drive unit 35 with the half bridge structure is only half of the efficiency of the main drive unit 35 with the full bridge structure.

The detection unit 33 detects a working environment parameter including an environment temperature and an input working voltage of the motor driver 3 and feeds back the detected environment temperature and input working voltage to the logical control unit 32.

The logical control unit 32 is an inner logical control part of the motor driver 3. The logical control unit 32 converts the motor drive control signal from the control unit 22 to be the logical control signal controlling the operation of the main drive unit 35. The logical control unit 32 may also judge the temperature and input working voltage from the detection unit 33 and output a warning signal of overtemperature, overvoltage or undervoltage.

The overcurrent protection unit includes an electrical signal detection unit for detecting the working current passing through the motor. The electrical signal may be current or voltage. In an implementation, the electrical signal detection unit may be a current sensor 34. The current sensor 34 detects a value of the current passing through the main drive unit 35 when the motor is rotating. The current value is converted to be a voltage signal. Alternatively, a voltage signal is obtained directly by a voltage sensor and is output to the control unit 22 of the microprocessor 2 by a pin IS OUT. The control unit 22 compares the detected current value or voltage value with a preset current value or voltage value and determines whether the motor is in a state of overcurrent or overvoltage. If the motor is in a state of overcurrent or overvoltage, the control unit 22 stops outputting the pulse width modulation signal or changes the rotation speed of the motor or other parameters of the motor.

In an implementation, the first communication unit 21 of the microprocessor 2 receives an LIN signal of the automobile controller and analyzes the LIN signal. Then the control unit 22 determines the rotation speed of the motor and outputs the pulse width modulation signal with a correct duty cycle to control the rotation speed of the motor. The microprocessor 2 circularly detects a phase and a rotation speed of the motor. For example, the microprocessor 2 detects the phase and rotation speed of the motor every 6.25 ms. When a given rotation speed range of the automobile controller changes, the microprocessor 2 detects the given rotation speed range immediately and outputs the pulse width modulation signal with the correct duty cycle to the motor driver 3. Meanwhile, the control unit 22 receives the phase of the motor fed back by a hall sensor (not shown in FIG. 6) and determines whether a direction of the drive current needs to be changed. If the direction of the drive current needs to be changed, the control unit 22 sends a direction changing signal indicating changing the direction of the drive current to the third communication unit 31 of the motor driver 3. In an implementation, the main drive unit 35 adopts a switch circuit with the full bridge structure, and the direction changing signal is through the SPI communication interface to the main control unit 35, the other group of the high side switch and low side switch of the main control unit 35 to turn on. In addition, the hall sensor detects the rotation speed of the motor in a real time manner, therefore, the control unit 22 adjusts the duty cycle of the pulse width modulation signal when detecting that the current rotation speed of the motor is not within the rotation speed range of the automobile controller, to make the duty cycle of the output pulse width modulation signal is adapted to the rotation speed signal sent by the automobile controller.

In addition, the detection unit 33 detects the current value of the environment temperature and working voltage of the motor in a real time manner, and sends the current value detected to the logical control unit 32. The logical control unit 32 determines whether the current value detected exceeds a preset range. If the current value detected exceeds the preset range, the logical control unit 32 feeds back a warning signal to the second communication unit 21 through the third communication unit 31. The second communication unit 21 analyzes the received warning signal and sends the analyzed warning signal to the control unit 22. The control unit 22 stops outputting the drive control signal after receiving the analyzed warning signal. That is, the control unit 22 stops outputting the pulse width modulation signal. Alternatively, the control unit 22 adjusts the rotation speed or other parameters of the motor after receiving the analyzed warning signal. After a period of time, when the logical control unit 32 determines that the current value of the environment temperature or working voltage of the motor becomes a normal value again, the logical control unit 32 feeds back a signal, which indicates that the environment temperature or input voltage becomes a normal value, to the control unit 22 through the third communication unit 31 and the second communication unit 21. The control unit 22 outputs the motor drive control signal based on the analyzed warning signal. That is, the control unit 22 outputs the pulse width modulation signal. Alternatively, the control unit 22 alters the rotation speed or other parameters of the motor based on the analyzed warning signal.

The motor driver 3 includes a first control pin PWM1 and a second control pin PWM2. The second control pin PWM2 is a multiplexing pin, which is used as an input pin through which the microprocessor 2 inputs the pulse width modulation signal to the motor driver 3, and is also used as an output pin IS OUT. The current sensor 34 may detect the value of the working current of the motor, reflect the value of the working current on the circuit, and output the value of the working current to the microprocessor 2 through the second control pin PWM2. A current-limiting protection circuit 5 is required to protect the microprocessor 2 when the second control pin PWM2 as an ISOUT pin is connected to the microprocessor 2. In an implementation, the current-limiting protection circuit 5 includes a current-limiting resistor R2 and a pull-down resistor R3. The current-limiting resistor R2 and the pull-down resistor R3 are arranged between the ISOUT pin and the current sensor 34. The current-limiting resistor R2 mainly plays the role of voltage dividing and current limiting to reduce the current impact to the IO interface of the microprocessor 2. One end of the pull-down resistor R3 is connected to the reference ground. The other end of the pull-down resistor R3 is connected between the current-limiting resistor R2 and the current sensor 34. The pull-down resistor R3 prevents the malfunction of the motor driver due to the PWM2 signal.

It should be noted that, in the embodiment, the power supply may be a battery of the automobile, and the motor of the electronic pump may be a brushless DC motor.

Above all, in the embodiment of the disclosure, the microprocessor 2 not only has basic functions of a microprocessor but also integrates the voltage regulator unit 24 and the first communication unit 23. The voltage outputted from the voltage regulator unit 24 supplies the power to the logical control unit 32 and third communication unit 31 of the motor driver 3, and also supplies power to the microprocessor 2 itself, which avoids a discrete voltage regulator chip and reduces the energy consumption.

In addition, the motor driver 3 is an integrated IC chip with the main drive unit integrated therein. The whole chip has functions of diagnosis, protection of short-circuit and open-circuit, protection of overtemperature, overvoltage and under voltage, and so on. The chip has a high electromagnetic compatibility and also improves the electromagnetic compatibility of the whole electronic pump controller. In addition, the current protection unit, which may detect the current passing through coils of the motor, is integrated in the motor driver 3, and thus without building a current protection circuit outside. The number of pins of the motor driver 3 is small, thus requirement on the pins of the microprocessor decreases.

It should be noted that, the above embodiments are only used to illustrate but not limit the technical solutions of the present application. Although the resent application is described in detail in conjunction with the above embodiments, those skilled in the art should understand that modifications or substitutions can be made to the embodiments by those skilled in the art. All the technical solutions and their changes not out of the spirit or field of the application should be in the protection field of the application.

The invention claimed is:

1. An electronic pump, comprising a controller and a motor; the controller comprising a power input terminal, a printed circuit board, a motor driver and a microprocessor; the power input terminal, the microprocessor and the motor driver being spaced from each other and being fixedly connected to the printed circuit board; the microprocessor being electrically connected to the motor driver by the printed circuit board;

wherein the microprocessor outputs or stops outputting a motor drive control signal based on a received control signal; the motor driver drives the motor to rotate based on the motor drive control signal from the microprocessor;

and wherein there is no motor drive circuit composed by discrete components and configured to drive the motor to rotate arranged separately on the printed circuit board between the motor driver and the motor, and wherein the microprocessor comprises a first communication unit, a control unit and a second communication unit; the motor driver comprises a detection unit, a third communication unit, a logical control unit and a main drive unit;

the first communication unit receives the control signal, analyzes the control signal and sends an analyzed control signal to the control unit; the control unit outputs or stops outputting the motor drive control signal based on the analyzed control signal; the logical control unit processes the motor drive control signal from the control unit to obtain a logical control signal; and the main drive unit receives the logical control signal and drives the motor to rotate.

2. The electronic pump according to claim 1, wherein the motor driver comprises an overcurrent protection unit; the overcurrent protection unit starts to perform self-protection when a current passing through the motor exceeds a preset range.

3. The electronic pump according to claim 2, wherein
the overcurrent protection unit comprises a current or voltage detection unit detecting a value of current or voltage passing through the motor;
the microprocessor collects the value, determines whether the value is in a preset target range, and stops outputting the motor drive control signal in a case that the value is not in the preset target range.

4. The electronic pump according to claim 1, wherein the controller further comprises a power protection circuit;
a power supply supplies power to the motor driver and the microprocessor via the power protection circuit;
one end of the power protection circuit is connected to the power supply and the other end of the power protection circuit is connected to the microprocessor and the motor driver.

5. The electronic pump according to claim 4, wherein the power protection circuit comprises a first capacitor, a second capacitor, a first diode, a metal oxide semiconductor transistor, a first resistor and a second diode,
wherein the first diode is a bidirectional transient voltage suppression diode; the second diode is a transient voltage regulator diode; one end of the first capacitor is electrically connected to a positive of the power supply; the other end of the first capacitor is connected to an negative of the power supply; one end of the first resistor is connected to the positive of the power supply; the other end of the first resistor is connected to the metal oxide semiconductor transistor; the second capacitor is connected to the first capacitor in parallel; the first diode is connected to the first capacitor in parallel; the second diode comprises an anode and a cathode; the anode is connected to a reference ground of the controller and the cathode is connected to the positive of the power supply; the metal oxide semiconductor transistor comprises a drain electrode, a source electrode and a gate electrode; the drain electrode is connected to the negative of the power supply; the source electrode is connected to the reference ground; and the gate electrode is connected to the first resistor.

6. The electronic pump according to claim 5, wherein electronic pump is applied to an automobile; the control signal received by the microprocessor comes from a controller of the automobile; the control signal comprises a target rotation speed range of the motor; the microprocessor generates a pulse width modulation signal having a duty cycle corresponding to the target rotation speed range of the motor and sends the pulse width modulation signal to the motor driver; and the motor driver controls the motor to rotate based on the pulse width modulation signal.

7. The electronic pump according to claim 5, wherein the motor driver comprises a detection unit; the detection unit detects a current working environment parameter of the motor driver and sends the current working environment parameter to the logical control unit; the current working environment parameter comprises an input voltage and an environment temperature; the logical control unit determines whether the current working environment parameter is in a preset target range; the logical control unit feeds back a warning signal, which indicates that the current working environment parameter is not in the preset target range, to the control unit through the third communication unit and the second communication unit in a case that the current working environment parameter is not in the preset target range; and the logical control unit feeds back a recovery signal to the control unit through the third communication unit and the second communication unit in a case that the current working environment parameter is in the preset target range again.

8. The electronic pump according to claim 7, wherein the electronic pump further comprises a hall sensor; the hall sensor is configured to detect a current rotation speed and a current phase of the motor and feeds back the current rotation speed and current phase of the motor to the first communication unit;

the control unit further determines whether the current rotation speed of the motor from the first communication unit is within a target rotation speed range of the motor, outputs the motor drive control signal if it is determined that the current rotation speed of the motor from the first communication unit is not within the target rotation speed range of the motor, and adjusts the current rotation speed of the motor to be within the target rotation speed range;

the control unit further determines whether a direction of a current passing through the motor needs to be adjusted based on the current phase of the motor, and sends a control signal for adjusting the direction of the current to the third communication unit through the second communication unit after it is determined that the direction of the current passing through the motor needs to be adjusted;

the third communication unit receives the control signal for adjusting the direction of the current; and the main drive unit adjusts the direction of the current passing through the motor based on the control signal after the control signal is logically processed by the logical control unit.

9. The electronic pump according to claim 4, wherein the power protection circuit comprises a first capacitor, a second capacitor, a first diode and a second diode, wherein the first diode is a bidirectional transient voltage suppression diode; one end of the first capacitor is electrically connected to a positive of the power supply; the other end of the first capacitor is connected to an negative of the power supply; one end of the first resistor is connected to the positive of the power supply; the second capacitor is connected to the first capacitor in parallel; the first diode is connected to the first capacitor in parallel; the second diode comprises an anode and a cathode; the anode is connected to a reference ground of the controller and the cathode is connected to the positive of the power supply.

10. The electronic pump according to claim 9, wherein the motor driver comprises a detection unit; the detection unit detects a current working environment parameter of the motor driver and sends the current working environment parameter to the logical control unit; the current working environment parameter comprises an input voltage and an environment temperature; the logical control unit determines whether the current working environment parameter is in a preset target range; the logical control unit feeds back a warning signal, which indicates that the current working environment parameter is not in the preset target range, to the control unit through the third communication unit and the second communication unit in a case that the current working environment parameter is not in the preset target range; and the logical control unit feeds back a recovery signal to the control unit through the third communication unit and the second communication unit in a case that the current working environment parameter is in the preset target range again.

11. The electronic pump according to claim 4, wherein the electronic pump is applied to an automobile; the control signal received by the microprocessor comes from a controller of the automobile; the control signal comprises a target rotation speed range of the motor; the microprocessor generates a pulse width modulation signal having a duty cycle corresponding to the target rotation speed range of the motor and sends the pulse width modulation signal to the motor driver; and the motor driver controls the motor to rotate based on the pulse width modulation signal.

12. The electronic pump according to claim 1, wherein the detection unit detects a current working environment parameter of the motor driver and sends the current working environment parameter to the logical control unit;

the current working environment parameter comprises an input voltage and an environment temperature; the logical control unit determines whether the current working environment parameter is in a preset target range; the logical control unit feeds back a warning signal, which indicates that the current working environment parameter is not in the preset target range, to the control unit through the third communication unit and the second communication unit in a case that the current working environment parameter is not in the preset target range; and the logical control unit feeds back a recovery signal to the control unit through the third communication unit and the second communication unit in a case that the current working environment parameter is in the preset target range again.

13. The electronic pump according to claim 12, wherein the electronic pump further comprises a hall sensor; the hall sensor is configured to detect a current rotation speed and a current phase of the motor and feeds back the current rotation speed and current phase of the motor to the first communication unit;

the control unit further determines whether the current rotation speed of the motor from the first communication unit is within a target rotation speed range of the motor, outputs the motor drive control signal if it is determined that the current rotation speed of the motor from the first communication unit is not within the target rotation speed range of the motor, and adjusts the current rotation speed of the motor to be within the target rotation speed range;

the control unit further determines whether a direction of a current passing through the motor needs to be adjusted based on the current phase of the motor, and sends a control signal for adjusting the direction of the current to the third communication unit through the second communication unit after it is determined that the direction of the current passing through the motor needs to be adjusted;

the third communication unit receives the control signal for adjusting the direction of the current; and the main drive unit adjusts the direction of the current passing through the motor based on the control signal after the control signal is logically processed by the logical control unit.

14. The electronic pump according to claim 13, wherein the motor driver comprises a current-limiting protection circuit; the current-limiting protection circuit comprises a current-limiting resistor and a pull-down resistor; one end of the current-limiting resistor is connected to the control unit; the other end of the current-limiting resistor is connected to the current sensor; one end of the pull-down resistor is connected to the reference ground; and the other end of the pull-down resistor is connected between the current-limiting resistor and the current sensor.

15. The electronic pump according to claim 14, wherein the microprocessor further comprises a voltage regulator unit;

the voltage regulator unit is configured to convert an inputted voltage from outside to a working voltage of each of the first communication unit, the second communication unit, the control unit, the logical control unit and the third communication unit.

16. The electronic pump according to claim 15, wherein the main drive unit comprises four N-type metal oxide semiconductor transistors, two of the N-type metal oxide semiconductor transistors are high side switches and the other two of the N-type metal oxide semiconductor transistors are low side switches; the high side switches and the low side switches are connected to form a connection with an H shape.

* * * * *